United States Patent
Otten

(10) Patent No.: US 9,308,716 B2
(45) Date of Patent: Apr. 12, 2016

(54) METHOD AND DEVICE FOR PLACING A PRINTING PLATE IN ITS REGISTER POSITION

(75) Inventor: Petrus Johannes Marie Otten, Vlissingen (NL)

(73) Assignee: AV Flexologic B.V. (NL)

( * ) Notice: Subject to any disclaimer, the term of this patent is extended or adjusted under 35 U.S.C. 154(b) by 230 days.

(21) Appl. No.: 13/489,514

(22) Filed: Jun. 6, 2012

(65) Prior Publication Data

US 2012/0304881 A1 Dec. 6, 2012

(30) Foreign Application Priority Data

Jun. 6, 2011 (NL) ...................................... 2006897

(51) Int. Cl.
| | |
|---|---|
| *B41F 27/12* | (2006.01) |
| *B41F 27/00* | (2006.01) |
| *H04N 1/00* | (2006.01) |

(52) U.S. Cl.
CPC ........... *B41F 27/005* (2013.01); *B41F 27/1262* (2013.01); *H04N 1/00705* (2013.01); *H04N 1/00734* (2013.01); *H04N 1/00761* (2013.01); *H04N 1/00771* (2013.01); *H04N 1/00774* (2013.01); *H04N 1/00785* (2013.01)

(58) Field of Classification Search
CPC ............................... B41F 27/08; B41F 27/005
USPC ........................... 101/DIG. 36, 481, 477, 486
See application file for complete search history.

(56) References Cited

U.S. PATENT DOCUMENTS

| | | | |
|---|---|---|---|
| 4,553,478 A | | 11/1985 | Greiner et al. |
| 4,653,369 A | * | 3/1987 | Dunsirn ....................... 83/411.7 |
| 5,158,017 A | * | 10/1992 | MacConnell et al. ........ 101/148 |
| 6,055,908 A | * | 5/2000 | Van Der Horst .............. 101/486 |
| 2005/0005802 A1 | * | 1/2005 | Dewitte ......................... 101/485 |
| 2007/0261580 A1 | * | 11/2007 | Otten ............................. 101/477 |

FOREIGN PATENT DOCUMENTS

| | | | | |
|---|---|---|---|---|
| EP | 0893254 | | 1/1999 | |
| JP | 2001277472 A | * | 10/2001 | .............. B41F 33/08 |
| WO | 2005105449 | | 11/2005 | |

* cited by examiner

*Primary Examiner* — Jennifer Simmons
*Assistant Examiner* — Ruben Parco, Jr.
(74) *Attorney, Agent, or Firm* — Banner & Witcoff, Ltd.

(57) ABSTRACT

A method and a device for placing a flexible printing plate in its register position, by placing the printing plate on a carrier, detecting the position of at least two reference marks, the relative position of which is known, by means of a camera while the printing plate is placed on the carrier, and transporting the printing plate to the register position. Prior to detecting the position of the reference marks, at least one of the reference marks is defined by moving the camera until a point within the part of the image whose relative position is known falls within the part of the image detected by the camera, and the position of the reference mark is stored together with properties of the reference mark detected by the camera.

6 Claims, 4 Drawing Sheets

METHOD AND DEVICE FOR PLACING A PRINTING PLATE IN ITS REGISTER POSITION

RELATED APPLICATIONS

This application claims priority of Dutch application NL 2006897 filed Jun. 6, 2011, hereby incorporated by reference in its entirety.

FIELD OF THE INVENTION

The invention relates to the positioning of printing plates in register, such as flexo-printing plates. The invention relates particularly to a method for positioning a flexible printing plate with a printable image in its register position, wherein a digital representation of at least a part of the image is known in the register position of the printing plate, comprising the steps of placing the printing plate on a carrier, detecting the position of at least two reference marks on the printing plate by means of a camera and transporting the printing plate from the position in which it is placed on the carrier to the register position.

BACKGROUND

Such a method is known from EP-A-0 329 228 and from EP-A-1 727 677.

In the method known from these documents the printing plates to be positioned are provided with at least two specific reference marks. Because the relative position of these reference marks relative to the printing plate are known, the printing plate can be placed in register by means of reference to these reference marks.

In the method known from EP-A-0 329 228 two cameras are used which are both coupled to a monitor. The cameras are positioned such that cross-hairs projected on the monitors coincide with the projection of the reference marks of the printing plate placed in register. Positioning of the monitors can take place manually, but can also take place under automatic control. When the cameras have thus been moved to the correct position, the printing plate is manipulated such that the projection of the reference marks on the monitor coincides with the cross-hairs on the monitor. It is noted that two reference marks are necessary here and that the method requires two cameras.

The method described in EP-A-1 727 677 operates automatically however; the camera is adapted to detect the position of the reference marks on the printing plates with a control member, and the control member calculates the path of the printing plates to the register position. A transport member then displaces the printing plate to the register position in accordance with the calculated path. Use is also made here of two reference marks.

In both cases the method requires a printing plate provided with at least two reference marks, as well as the information as to where these reference marks are located on the printing plate, or the relative position of the reference marks relative to the printing plate. These reference marks are printed onto the printed material. Now that the quality of printed material produced by means of flexo-printing techniques is improving, these reference marks, which can usually also be seen on the printed material, are increasingly perceived as disturbing. These drawbacks are partially obviated by making use of reference marks with very small dimensions, also known as microdots, but an increasing need remains for printing plates no longer provided with reference marks leaving an imprint.

SUMMARY

In order to meet this requirement the invention provides a method of the above stated type wherein the position of the reference marks is detected by selecting as a reference mark a first point and a second point within the part of the image observed by the camera and of which the position is digitally represented, determining the coordinates of the selected reference marks on the printing plate, searching the coordinates of the reference marks in the digital representation of the image in the register position of the printing plate, comparing the coordinates of the reference marks on the printing plate in the position observed by the camera and the coordinates in the digital representation of the image in the register position and calculating the path to be travelled over by the printing plate for control of the transport of the printing plate.

The invention likewise provides a device for placing in its register position a flexible printing plate provided with an image with at least two reference marks, and wherein the position of the at least two reference marks in a digital representation of at least a part of the register position is known, wherein the device comprises supporting means for carrying a holder for a printing plate to be positioned in its register position, a movable camera adapted to detect at least a part of the carrier, transport means for transporting the printing plate to its register position and a control member connected to the camera for recognizing the two reference marks, for storing a digital representation of the image and for controlling the transport means, wherein the control member is adapted for determining the coordinates of the selected reference marks on the printing plate, to search coordinates of reference marks in the digital representation of the image in the register position of the printing plate, comparing the coordinates of the reference marks on the printing plate in the position observed by the camera and the coordinates in the digital representation of the image in its register position and calculating the path to be travelled over by the printing plate for control of the transport of the printing plate.

This method and apparatus allow use of randomly definable reference marks which can be formed by parts of the printing plate associated with the image for printing. This dispenses with the need to use specific reference marks. The definition of the reference marks takes place by placing the camera such that the intended reference mark falls within the detection range of the camera.

When use is made of two or more reference marks, these are preferably the same. Only a single definition of the reference mark need in this case take place. In a specific embodiment, following the definition of a first reference mark, a search is made for this purpose for a corresponding second reference mark and the position of the second reference mark is determined. It is also possible for a number of printing plates, possibly different printing plates, to be provided with the same reference mark.

It is likewise possible to make use of mutually differing parts of the image. Following the definition of a first reference mark, a second reference mark is for this purpose defined by moving the camera until a point within the part of the image whose relative position is known falls within the part of the image detected by the camera, and the position of the second reference mark is stored together with the properties of the second reference mark detected by the camera.

An attractive embodiment results when selection of a reference mark takes place by moving the camera until a point within the part of the image observed by the camera and of which the relative position is known as depicted on a monitor representing the image observed by the camera, coincides with a reference projected on the monitor.

This embodiment likewise provides a device of the above stated type, comprising a monitor for displaying the image detected by the camera, the monitor is provided with a marking such as a cross-wire, and the apparatus comprises an activating element for activating the control element and that the control element is adapted to store as reference mark visually detectable properties of an image on the printing plate located in the vicinity of a marking within the detection range of the camera.

There are different options for defining the reference mark; according to a first embodiment the reference mark is formed by a reference mark arranged specifically on the printing plate. While one of the advantages of the invention, that of avoiding disturbing printing of reference marks, is not hereby prevented, the embodiment can however be attractive for use with printing plates of an existing design still provided with such specific reference marks. The embodiment therefore provides a method of the above stated type wherein the user changes the detection range of the camera until a reference mark specifically arranged on the printing plate is located within the partial detection range of the camera. The embodiment likewise relates to a device wherein the control member is adapted to store as reference mark visually detectable properties of a reference mark arranged specifically on the printing plate.

It is however recommended that use be made of a small part of the image for printing as reference mark. This is manifested in a method wherein the user moves the camera until he observes that a proposed reference mark coincides with a reference projected on the monitor, on coincidence he activates the control element and that during activation, the control member stores as reference mark visually detectable properties of the image part in the vicinity of the marking.

In the above elucidated embodiments there is always a small part of the image which functions as reference or reference mark. It is however also possible to make use of a larger part of the image. A relevant embodiment provides for this purpose a method wherein the user changes the detection range of the camera until a part of the contour of the printing plate is located within the detection range of the camera, and a device wherein the control member is adapted to store as reference mark visually detectable properties of a part of the contour of the printing plate. The invention likewise relates to such a device wherein the control member is adapted to store as reference mark visually detectable properties of a part of the contour of the printing plate.

According to preferred embodiment the position of the printing plate is determined and that the path to be travelled over is calculated once again by comparison of the actual position and the register position after having travelled over a part of the determined path.

According to another embodiment after the positioning of a first printing plate for printing a first colour of an image to be printed, the method is repeated with a second printing plate for a second colour of the same image and that as a reference mark on the second printing plate a part of the printing plate is selected which coincides as much as possible with the selected reference mark on the first printing plate.

According to a preferred embodiment, the method according to the invention comprises the step of a control member connected to the camera determining the location of the at least one reference mark and calculating the path of movement of the printing plate from the position in which the printing plate is placed on the carrier to its register position. The invention can hereby be applied on an automatic mounting table as described in EP-A-1 727 677. The invention then relates to an associated device provided with a transport element for transporting the printing plate to the register position under the control of the control member.

BRIEF DESCRIPTION OF THE DRAWINGS

The present invention will be elucidated hereinbelow on the basis of the accompanying drawings, in which.

DETAILED DESCRIPTION

Figure 1:
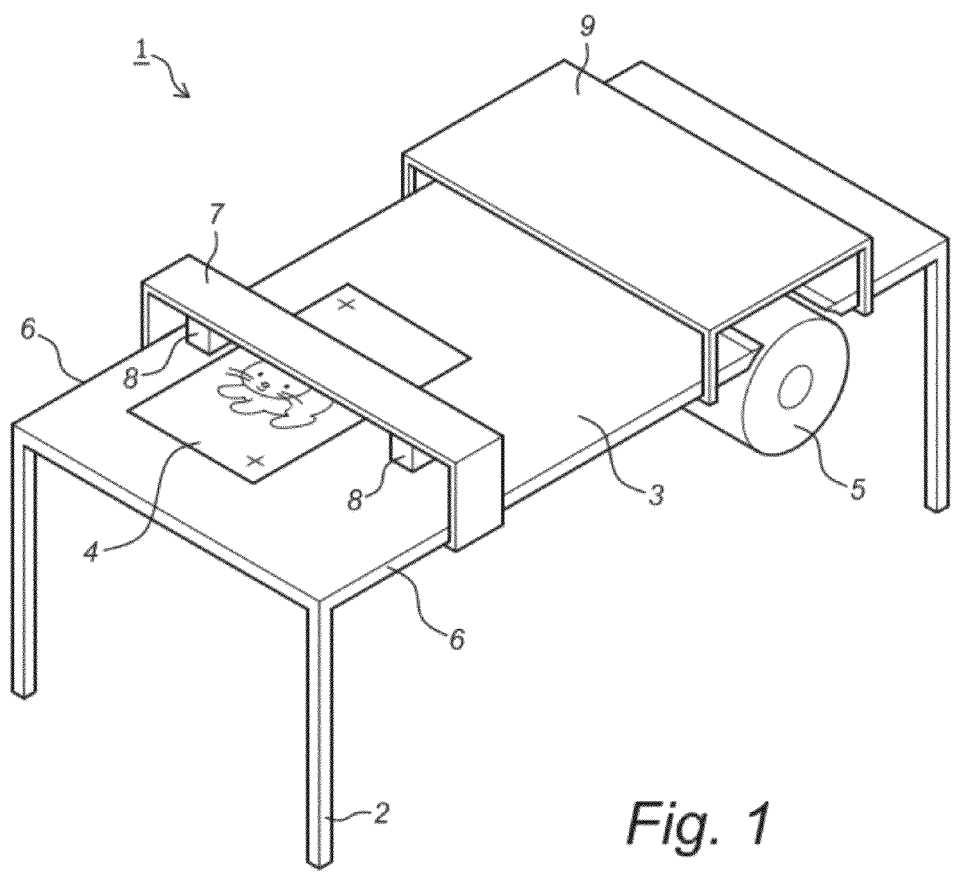
FIG. 1 is a schematic perspective view of an embodiment of the invention.

FIG. 1 shows a mounting table designated in its entirety with 1, which is provided with a frame 2 on which is placed a carrier plate 3 for carrying a printing plate 4. A cylinder 5 is mounted in the frame by means of a bearing, not shown in the drawing. This cylinder 5 can be formed by a printing cylinder, although it is likewise possible for cylinder 5 to function as carrier for a mounting sleeve. Arranged along the long sides of carrier plate 3 is a pair of guide rails 6 on which a camera bridge 7 provided with two cameras 8 can move in the longitudinal direction of the carrier plate. Cameras 8 are likewise movable in the transverse direction of the carrier plate. A manipulator bridge 9 is also movable along guide rails 6 in longitudinal direction of the carrier plate. Manipulators (not shown) for transporting printing plates 4 are arranged on the underside of manipulator bridge 9. Manipulator bridge 9 and camera bridge 7 are adapted here to move alongside and one under the other.

Figure 2:
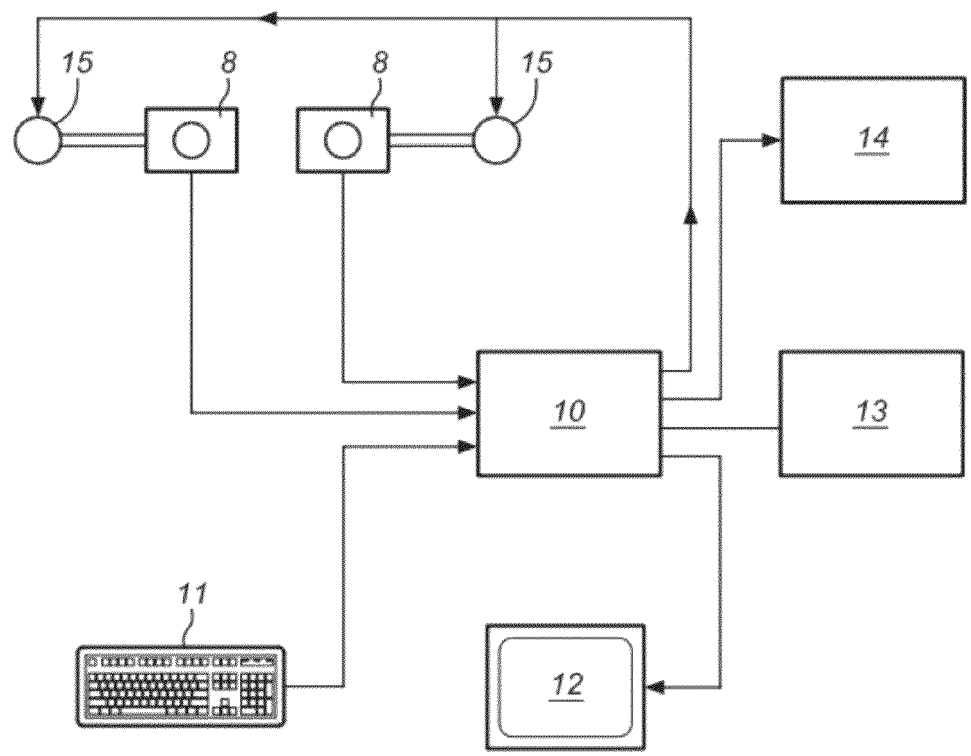
FIG. 2 is a block diagram of the embodiment shown in FIG. 1.

FIG. 2 shows a block diagram of the mounting table according to the invention. The components are designated here with the same reference numerals as in FIG. 1. The basis of the block diagram is formed by a processor 10 which is coupled to a keyboard 11, a monitor 12 and a memory 13. These components preferably form part of a personal computer. Processor 10 is connected to the manipulator 14 covered in FIG. 1 by the manipulator bridge. Both cameras 8 are also connected to the processor for transmitting their images so that these images can be displayed on the monitor. It is not precluded that the images generated by cameras 8 are displayed on separate monitors. The position of each of the cameras is adjustable by means of a motor 15. It is noted here that the cameras are movable in two directions, this being represented symbolically by a single motor 15. It will otherwise be apparent that the cameras are provided with other controllable variables such as diaphragm and focal adjustment.

Figure 3:
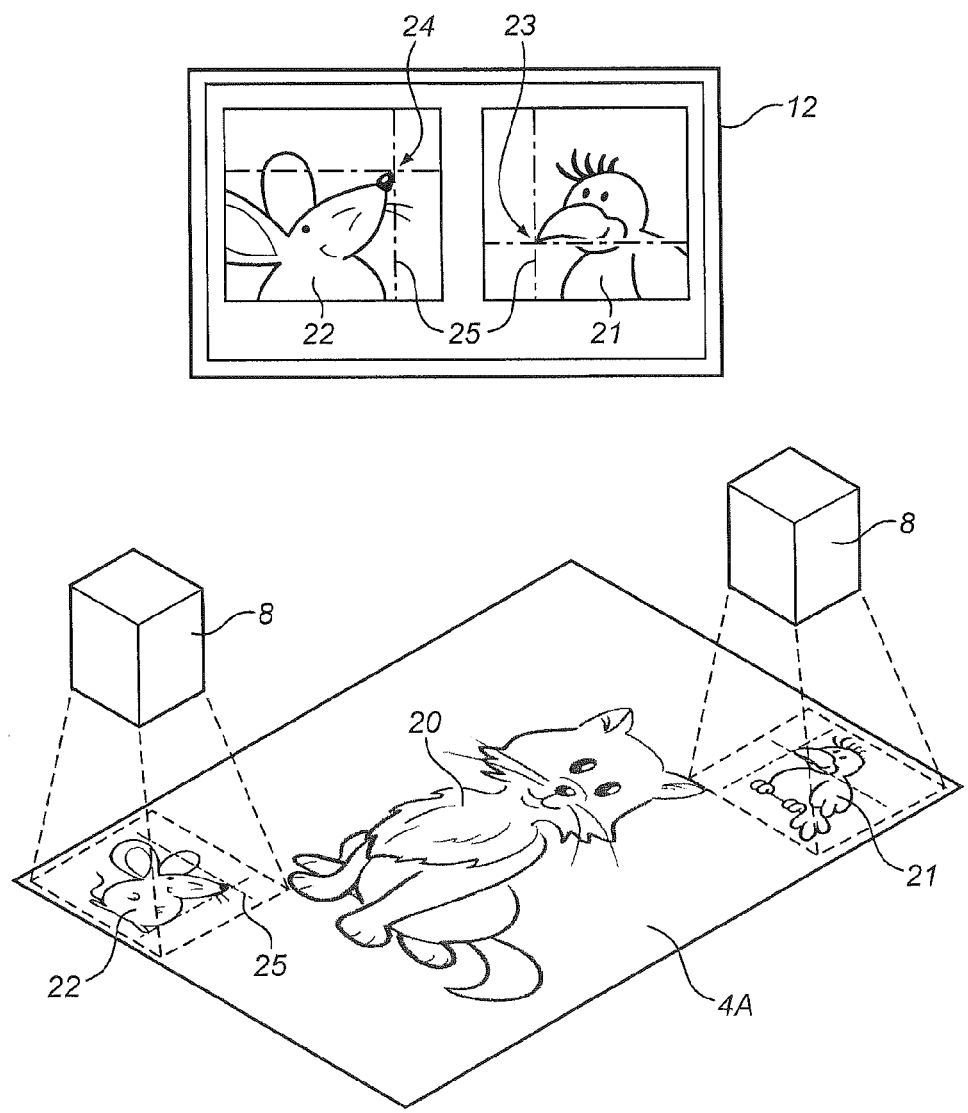
FIG. 3 is a schematic perspective view of parts of the embodiment shown in FIG. 1.

How the method according to the invention is applied is described below with reference to FIG. 3. Use is made by way of example of a printing plate 4A as shown in FIG. 3. Printing plate 4A comprises the image of a cat 20 and, in opposite corners, a bird 21 and a mouse 22. Printing plate 4A is not provided with specific reference marks such as cross-hairs. According to the present invention two parts of the image on printing plate 4A are selected which can be easily distinguished and which lie sufficiently far from each other to be able to function as reference mark. The tip 23 of the beak of bird 21 and the tip 24 of the nose of mouse 22 are selected here in the present example.

As in the prior art method, the printing plate 4A is laid for this purpose on carrier plate 3. One of the cameras 8 is then placed above a selected part of printing plate 4, in the present embodiment above the bird 21. The image detected by camera 8 is displayed on monitor 12. A cross-wire 25 is projected in the part of monitor 12 displaying the image of bird 21, and camera 8 is manipulated such that the crossing of the wires of cross-wire 25 coincides with the selected point, i.e. the tip 23 of the beak of bird 21. When this point 23 coincides with the centre of the cross-wire 25 a command is given to the processor. The processor then stores the location of the point as well as the image, or part thereof, displayed on the monitor. This procedure is then repeated for the other part of the image, i.e. the tip 24 of the nose of mouse 22. Use can be made for this purpose of the same camera 8 as used for the first part of the image, although it is also possible to make use of a second camera as in the embodiment shown in FIGS. 1 and 2. The coordinates of the tip 24 of the nose of mouse 22 are thus also stored together with the image, or a part thereof, displayed on the monitor.

The processor subsequently compares the two stored part-images to the digital representation of the image of printing plate 4A present in the memory of the processor. The actual position of printing plate 4A on carrier plate 3 is calculated from this comparison. Now this information is known, and assuming that the desired position of printing plate 4A on cylinder 5, also referred to as the register position, is known, the path from the actual position on the carrier plate to the desired register position can be determined and, using the result of this calculation, the manipulator can be correspondingly controlled. It is noted here that the means for such automatic mounting are per se known from the patent application EP-A-1 727 677.

The same method can be performed with a printing plate which is provided with specific reference marks. In many cases the relative position of these reference marks is known, so that the definition does not actually add anything and it is only necessary to determine the position of the reference marks. This corresponds very much to the teaching of EP-A-1 727 677. However, if the position of the reference marks were not known, during definition of the reference mark not only can the position thereof be recorded, but the relative position of the reference mark relative to the contour can also be determined, and thereby the register position.

The above method is performed here using the definition of two different parts of the image, i.e. the tip of the beak of the bird and the tip of the nose of the mouse; when the image is not suitable for this purpose, for instance in the case of an image with a repetitive pattern, use can be made of a part of the image which appears twice in the image to be printed. A reference mark need only be defined once here.

It also occurs in practice that more than one identical printing plate has to be placed on the same printing cylinder. Only one reference mark need be defined here for the first printing plate or, if the reference marks differ, two reference marks.

Figure 4:
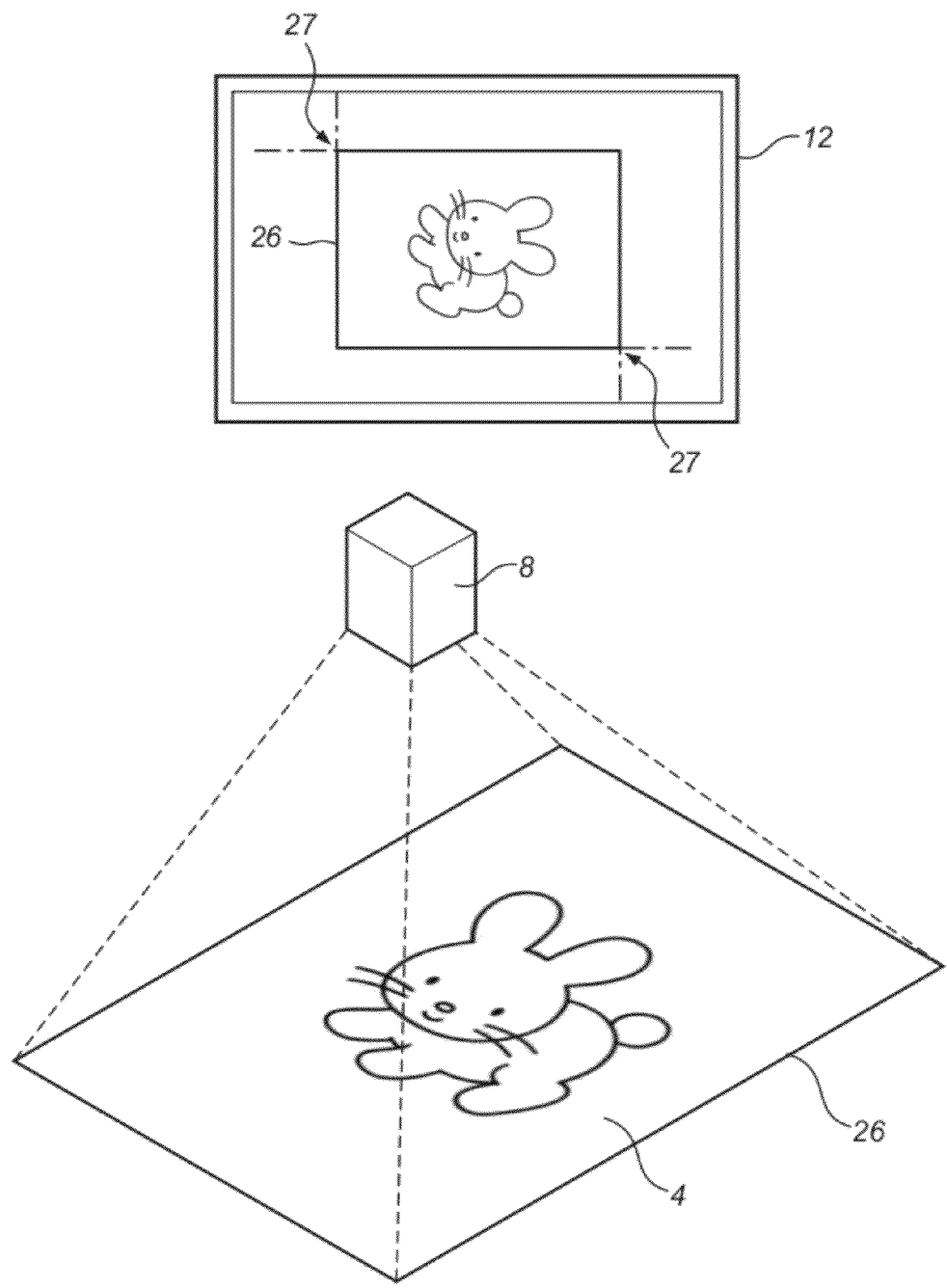
FIG. 4 is a schematic perspective view of corresponding parts of an alternative embodiment.

Finally, FIG. 4 shows how the corners of contour 26 of printing plate 4 are used as reference mark. Here the camera 8 initially detects the whole printing plate 4, including the rabbit shown thereon, and then zooms in on two, preferably diagonal corners, being parts of the contour of the printing plate. Both corners 26, 27 are then defined as reference mark and stored as such. It is however noted here that this embodiment requires the edges of printing plate 4 to be accurately cut, or in any case to be dimensionally stable. If this is not the case, corners 26, 27 of other structures situated at the edges of the printing plate, such as frames, can be used.

It will be apparent that within the context of the invention as defined by the appended claims diverse changes can be made to the embodiments described here.

I claim:

1. A method for positioning a flexible printing plate with a printable image in a register position, the printing plate having the printable image only, the method comprising the steps of:

providing a digital representation of the printable image in a memory of a control element;

associating the digital representation of the printable image with the register position;

placing the printing plate on a carrier in a random initial position, wherein the printable image of the printing plate is within a field of view of a camera located above the carrier;

displaying a portion of the printable image observed by the camera on a monitor;

selecting a first distinctive part of the printable image on the printing plate by moving the camera until a point within the portion of the printable image observed by the camera is depicted as coinciding with a reference projected on the monitor and on coincidence the user activates the control element and, on activation, a control member stores coordinates of the first distinctive part in the initial position, wherein a desired position of the point is known in the control element;

displaying a second portion of the printable image observed by the camera on the monitor;

selecting a second distinctive part of the printable image by moving the camera until a second point within the second portion of the printable image observed by the camera is depicted as coinciding with a second reference projected on the monitor and on coincidence the user activates the control element and, on activation, the control member stores second coordinates of the second distinctive part in the initial position, wherein a second desired position of the second point is known in the control element;

determining desired coordinates, of the first and second distinctive parts of the printable image, to be occupied by the first and second distinctive parts when the printing plate is in the register position;

searching for the desired coordinates of the first and second distinctive parts of the printable image in the control element;

comparing the coordinates and the second coordinates with the desired coordinates of the first and second distinctive parts;

calculating a path to be travelled by the printing plate from the initial position to the register position; and transporting the printing plate from the initial position to the register position.

2. The method as claimed in claim 1, characterized in that the control element executes a comparison between the portion of the image observed by the camera and the digital representation and that the control element calculates the path over which the printing plate is transported by result of the comparison.

3. The method as claimed in claim 1, characterized in that after having travelled over a part of the path, a position of the printing plate is determined and that another path to be travelled over is calculated by comparison of the position and the register position.

4. The method as claimed in claim 1, characterized in that after positioning the printing plate, the method is repeated with a second printing plate having a second printable image identical to the printable image and having a third and fourth distinctive parts of the second printable image being respectively identical to the first and second distinctive parts, wherein the third and fourth distinctive parts are selected for positioning the second printing plate.

5. The method as claimed in claim 1, characterized in that after positioning the printing plate for printing a first colour of an image to be printed, the method is repeated with a second printing plate, having a second printable image identical to the printable image, for a second colour and that a third and fourth distinctive parts of the second printable image which respectively coincide as much as possible with the first and second distinctive parts are selected for positioning the second printing plate.

6. A device for positioning, in a register position, a flexible printing plate provided with a printable image with at least a first distinctive part and a second distinctive part wherein the device comprises:

supporting means for carrying a carrier for the printing plate to be positioned in the register position;

a movable camera having a field of view adapted to allow the movable camera to detect at least a part of the printing plate in an initial position on the carrier;

a display adapted to display the part of the printable image observed by the camera;

transport means for transporting the printing plate to the register position; and a control member connected to the camera and adapted for:

selecting the first distinctive part by storing coordinates of the first distinctive part of the printable image of the printing plate in an initial position when a user activates a control element a first time;

selecting the second distinctive part by storing second coordinates of the second distinctive part of the printing plate in the initial position when the user activates the control element a second time;

determining desired coordinates of the first and the second distinctive parts, the desired coordinates of the first and second distinctive parts indicating registration positions in which the first and second distinctive parts are to be located after positioning of the printing plate in the register position, the digital representation being associated with the register position;

searching for the desired coordinates of the first and the second distinctive parts;

comparing the coordinates and the second coordinates with the desired coordinates of the first and the second distinctive parts; and calculating a path to be travelled by the printing plate from the initial position to the register position.

* * * * *